(12) United States Patent
Wiki et al.

(10) Patent No.: US 6,922,287 B2
(45) Date of Patent: Jul. 26, 2005

(54) LIGHT COUPLING ELEMENT

(75) Inventors: Max Wiki, Zurich (CH); Bernd Maisenholder, Zurich (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 432 days.

(21) Appl. No.: 10/047,530

(22) Filed: Oct. 23, 2001

(65) Prior Publication Data

US 2003/0072529 A1 Apr. 17, 2003

(30) Foreign Application Priority Data

Oct. 12, 2001 (CH) ............................................. 1887/01

(51) Int. Cl.[7] .................................................. G02B 5/18
(52) U.S. Cl. ...................... 359/569; 359/566; 359/572; 359/486
(58) Field of Search ................................ 359/486, 489, 359/507, 500, 566, 569, 572, 565

(56) References Cited

U.S. PATENT DOCUMENTS 3,354,022 A   11/1967  Dettre et al.
5,694,247 A   12/1997  Ophey et al.
5,755,501 A    5/1998  Shinohara et al.
6,031,951 A    2/2000  Stiens

FOREIGN PATENT DOCUMENTS

| DE | 2 050 652 | 4/1972 |
| EP | 0 509 343 A2 | 4/1992 |
| EP | 1 040 874 A2 | 10/2000 |
| EP | 1 096 274 A2 | 5/2001 |
| WO | WO 96/04123 | 2/1996 |
| WO | WO 01/02839 A1 | 1/2001 |

OTHER PUBLICATIONS

Article from J. Opt. Soc. Am. A., vol. 11, No. 10, Oct., 1994—*Artificial Uniaxial and Biaxial Dielectrics with Use of Two–Dimensional Subwavelength Binary Gratings*, Grann, et al, pp. 2695–2703.

*Primary Examiner*—Fayez G. Assaf
(74) *Attorney, Agent, or Firm*—Notaro&Michalos PC

(57) ABSTRACT

A light coupling element is proposed with a surface (3) of a material which is transparent to light of a given wavelength ($\lambda$). In order for the light coupling element to act independently of the direction of the vectorial parameters of the light, such as in particular of the polarization, on the surface of the light coupling element line-form indentations or elevations ($5_1$, $5_2$) are provided which are equidistantly parallel and which intersect at given angles ($\phi$).

51 Claims, 3 Drawing Sheets

LIGHT COUPLING ELEMENT

FIELD AND BACKGROUND OF THE INVENTION

The present invention relates to a light coupling element with a surface comprised of a material which is transparent to light of a given wavelength, wherein in at least one region of the surface a line grating is present with equidistant parallel line-form indentations or with equidistant parallel line-form elevations.

The present invention builds primarily on findings which were obtained on light coupling elements of said type to demonstrate chemical or biochemical reactions in conjunction with fluorescence. In this respect reference is made in particular to WO 01/02839, wherein within the scope of an analysis platform such a light coupling element is described. An effect, known as "abnormal reflection" is utilized. Therein a support provided with a layer is provided. This support, and also the layer, is preferably transparent to light of a given wavelength λ in the UV VIS or NIR range (200 nm to 2000 nm) of a light source, preferably of an at least approximately monochromatic light source, such as for example of a laser or an LED. In the case of dielectric material, the material of the layer has a substantially higher refractive index than the material of the support, viewed at the given wavelength. The surface of the support, on which the layer is placed, has a line grating, whose structure is transferred via the thin layer to the surface of the layer. In the utilized "abnormal reflection effect" light of the given wavelength is virtually completely reflected when a specific angle of incidence is maintained and virtually no light is transmitted along the layer or through the layer. With suitable selection of the structure parameters the evanescent, i.e. transversely damped, electromagnetic field in the immediate vicinity of the layer surface becomes especially strong, whereby fluorescence molecules are especially efficiently excited in this region. This permits detecting substantially lower concentrations of substances provided with so-called fluorescence labels at the layer surface of samples to be analyzed than was possible with methods known prior to that publication.

The line grating or the line gratings present at the two interfaces support substrate/layer and layer/ambient atmosphere, which in a view from above are aligned such that they are congruent one beneath the other are therein directed in the sense that the line-form indentations and the elevations resulting in between extend wavelike in one direction. Viewed as a structure wave, the light coupling element provided with the line gratings extends one-dimensionally perpendicular to the line-form indentations or elevations disposed in between. Taking into consideration this directionality, in view of the advance described in detail in that publication, laser light of said given wavelength is first polarized in a specific direction by means of a polarizer, before the platform with the light coupling element is impinged upon therewith.

If light coupling elements are considered for other optical analytical methods or for telecommunication purposes, thus for example for coupling in or respectively coupling out laser light into or, respectively from light wave-guiding layers, it is apparent even in these cases that the provided line gratings in said sense are directed one-dimensionally, i.e. the provided line-form indentations and elevations formed between them, extend in a direction along the surface. Due to this directionality in principle vectorial parameters of the light supplied to the light coupling element are spatially weighted and, depending on their direction, are affected differently by the light coupling element. Typically, when employing the advance according to the cited WO 01/02839, the impinging light is affected differently at the light coupling element depending on the direction of polarization.

It is the task of the present invention to provide a light coupling element of the above type, which in principle impinges to an increased extent upon vectorial parameters of the impinging light, such as in particular on its polarization, independently of the vector direction.

This is attained in a light coupling element of the above type, which has in at least one region of the surface equidistantly parallel line-form indentations, thereby that on the surface further equidistantly parallel line-form indentations are present, which intersect said first mentioned indentations.

Alternatively, this is attained on a light coupling element of the above type, in which in at least one region of the surface equidistantly parallel, line-form elevations are present, thereby that on said surface further equidistantly parallel line-form elevations are present, which intersect the first mentioned elevations.

The periodicity of the prior known as well as also the inventive gratings, i.e. the sequential distance of said indentations or elevations, is laid out as a function of the given wavelength of the light which is to be employed for the application purpose of the light coupling element.

Consequently, WO 01/02839 as well as also WO 00/75644 therefore proposes that if the light coupling element is to be applied with light of two wavelengths, to develop it with parallel indentations or elevations, but not with equidistant ones, i.e. with locally modulated grating periods or with intersecting line gratings, of which one is optimized with a first period for light of the one wavelength and whereon the second line grating, optimized for a second wavelength, is realized with a period deviating from the first.

Still vectorial parameters of the light of one of said wavelengths are treated therein and at the light coupling element with different weighting as a function of the vector direction, such as in particular depending on its direction of polarization.

In the light coupling element according to the invention, in which line-form indentations, which are equidistant and parallel to one another, intersect, islands of elevations are generated framed by said indentations and lying between them. Analogously, in the light coupling element of the above type, in which equidistantly parallel line-form elevations intersect, interspaced indentation islands are formed.

In connection with providing raised structures, reference can further be made to EP 1 040 874. Therein is proposed that in order to specifically affect the wettability of surfaces for optical analytical techniques, to develop surface areas, which are not to be wetted, with elevations structures, whose height does not fall below a certain minimum measure, namely of 50 nm to 10 μm such that regions provided with such structures in connection with the surface energy of the nonstructured surface material prevent wetting and that this wetting is concentrated in non-structured surface regions. Even though said structured regions according to EP 1 040 874 are not light coupling regions—since samples are precisely not to be present there—and the described raised structures do not have to satisfy any criteria with respect to optical effect, according to the present invention and as will yet be described, the field of surface wettability related to the surface energy of surface regions will also be addressed.

As stated, from the cited EP 1 040 874 the rules are known to define regions on a surface which are not to be wetted with hydrophobically structured surfaces and therewith also those to be wetted. In the approach according to the present invention the following advantages are accomplished in this connection in addition to the solution of the above described task:

The surface energy of an interface with a liquid is proportional to the surface available in a defined observation region. If the surface in said region is planar, this surface which can be denoted as specific surface, is far smaller than if in the same observation region the surface is roughened. If on such a surface region a drop of liquid is deposited, it expands on this region such that an energy minimum is attained. This means, pragmatically that a drop of liquid on said region with increasing specific surface increasingly contracts until the effect is reached utilized according to EP 1 040 874, that namely the liquid drops off the observed region.

SUMMARY OF THE INVENTION

In the light coupling element according to the present invention the specific surface is increased in the observed region, compared to the case in which only one line grating is provided, but only so far that while a drop placed thereon contracts, it does, however, not drop off. In the above preferred application of the light coupling element according to the invention for generating evanescent, i.e. transversely damped, electromagnetic fields within the scope of a technique such as is prior known, for example from WO 01/02839, thereby an increased concentration results of an applied liquid substance, provided with labels, on the surface, which, in turn, increases the resulting fluorescence signal which can be read out and, additionally, entails the advantage that in the region considered a majority, even a multitude, of discrete liquid drops can be deposited without these merging into one another.

In a preferred embodiment of the light coupling element according to the invention it is proposed to provide indentations having three levels of depth.

By the staggering in the depth of the indentations, an additional parameter is provided for varying the size of said specific surface.

It must be taken into consideration that inwardly projecting side areal parts of said indentations also determine said specific surface, and that deeper indentations increase said specific surface more than shallower indentations.

In a further preferred embodiment of the inventive light coupling element the indentations are substantially of equal depth everywhere.

Even though the equidistantly parallel line-form indentations or elevations provided according to the invention can extend, for example, arc-formed along the considered region, in a highly preferred embodiment of the inventive light coupling element it is proposed to provide the line-form indentations or elevations such that they are linear.

According to the fundamental aspect of the present invention said line-form indentations or elevations can intersect at oblique angles while the task posed in the introduction is still being solved. Light of a given wavelength is affected on a considered line grating, as a function inter alia of the depth of the grating, of the period of the grating and within such a period of the duty cycle of indentations and elevations. It is thus entirely possible to treat vectorial parameters of the considered light, such as in particular its direction of polarization, at least approximately identically at the light coupling element according to the invention if, in the case of line-form indentations or elevations intersecting at oblique angles, this angular obliquity is compensated by a correspondingly different layout of said parameters, namely grating depth, grating period and duty cycle, at the intersecting patterns. For example, in this way an effect which is largely independent of the direction of polarization of the light can also be attained through the light coupling element. In a highly preferred embodiment the line-form indentations or the line-form elevations intersect at right angles. Further, in this case the distances of the successive equidistantly parallel line-form indentations or elevations are identical. With respect to the given wavelength $\lambda$, preferably between 20 nm and 2000 nm, preferably the following dimensioning specifications (in air) are observed:

Grating period, defined as the distance of successive line-form indentations or elevations:

$0.1\lambda \leq d_0 < 10\ \lambda$ preferably: $0.2\lambda \leq d_0 \leq 2\ \lambda$ especially preferred: $0.5\lambda \leq d_0 \leq 0.6\ \lambda$ Grating depth, defined as the depth between line-form elevations or line-form indentations:

$0.001\lambda < d_T < 10\ \lambda$ preferably: $0.01\lambda \leq d_T \leq \lambda$ especially preferred: $0.05\lambda \leq d_T \leq 0.2\ \lambda$ Therein the following absolute dimensions result:

The distances of the provided line-form indentations or elevations, $d_0$ are preferably 20 nm to 20000 nm, especially preferred are 40 nm to 4000 nm, highly preferred between 100 nm and 1200 nm.

The depth $d_T$ of the provided indentations is therein preferably 0.2 nm to 20000 nm, especially preferably between 2 nm and 2000 nm, highly preferably between 10 nm and 400 nm.

As the duty cycle, defined as the ratio of elevation width $d_7$ to the distance of successive line-form indentations, preferably a range of 0.2 to 0.8, in particular preferably of 0.4 to 0.6 is selected.

In a further preferred realization of the inventive light coupling element said surface is one of a layer which is applied on a support. In particular in view of a preferred application of the light coupling element according to the invention, namely within the framework of a fluorescence marker measuring method by means of evanescent, transversely damped electromagnetic fields, in particular as described in WO 00/75644, it is proposed that the surface of the support in said region has the same indentation/elevation structure as the surface of the layer and, viewed from above, the structures are aligned one on another.

The material of the support has a refractive index for the light of given wavelength which is lower than the refractive index of the layer material.

The layer of at least one high-refractive material comprises preferably at least one of the materials $Ta_2O_5$, $TiO_2$, $NbO_5$, $ZrO_2$, $ZnO$ or $HfO_2$ and has preferably a thickness, relative to the given wavelength $\lambda$ in air of:

layer thickness:

$0.01\lambda \leq d_S \leq 10\ \lambda$ preferably: $0.1\lambda \leq d_S \leq 2\ \lambda$ especially preferred: $0.2\lambda \leq d_S \leq 0.3\ \lambda$.

The absolute thickness is thus preferably:

$2\ \text{nm} \leq d_S \leq 20000$ preferred is $20\ \text{nm} \leq d_S \leq 4000\ \text{nm}$ especially preferred:

$$40\text{ nm} \leq d_s \leq 600\text{ nm}.$$

When employing the light coupling element for biochemical applications, a chemical composition on the surface deviating from a high-refractive material can be of advantage. (For example if a chemical process to be applied on the structure was optimized for adhesion on $SiO_2$, it is possible to apply a very thin and thus optically not, or not disadvantageously, effective $SiO_2$ layer onto the high-refractive layer.) This can be attained thereby that an additional thin layer, preferably of thickness d with $0.001\lambda \leq d \leq 0.2\ \lambda$, preferably $0.01\lambda \leq d \leq 0.05\ \lambda$ of a further material, preferably of $SiO_2$, is applied. The absolute thickness d of this additional layer is therein thus, with the preferred $\lambda$ between 200 nm and 2000 nm, preferably:

$$0.2\text{nm} \leq d \leq 400\text{ nm}$$

preferably $$2\text{ nm} \leq d \leq 100\text{ nm}.$$

BRIEF DESCRIPTION OF THE DRAWINGS

In the following the invention will be explained by examples in conjunction with Figures. Therein depict.

DESCRIPTION OF THE PREFERRED EMBODIMENTS

Figure 1:
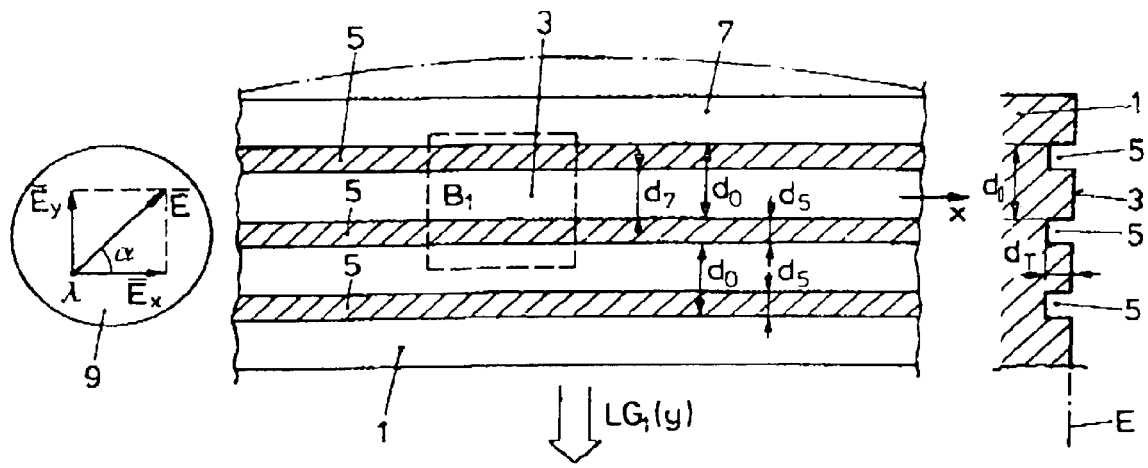
FIG. 1 schematically and in top view a light coupling element of known type with one-dimensional line grating, FIG. 2 in a representation analogous to that of FIG. 1 in top view and with two sectional representations, a first preferred embodiment of a light coupling element according to the invention, FIG. 3 in top view representation analogous to that of FIG. 2 a further embodiment of a light coupling element according to the invention, FIGS. 4(a) and 4(b) schematically the effect of the surface structuring on the formation of a drop of liquid placed onto the surface, FIG. 5 in conjunction with a top view representation in analogy to FIG. 2 or 3, a light coupling element according to the invention with indentations at three different indentation depth levels, FIG. 6 a preferred embodiment of a light coupling element according to the invention in schematically perspective representation and realized according to the embodiment of FIG. 2, and FIG. 7 in a representation analogous to that of FIG. 6, a light coupling element realized according to the embodiment of FIG. 3.

In FIG. 1, on one hand in top view, on the other hand in a side view is shown a line grating of prior art. A line grating is worked into the surface 3 of a material transparent to light of a given wavelength, in particular for laserlight of wavelength $\lambda=633$ nm, such as for example of $Ta_2O_5$. The line grating comprises indentations 5 which are parallel to one another, and, if light of a single wavelength $\lambda$ is to be incident on it, preferably with 200 nm$\leq\lambda\leq$2000 nm, and the indentations 5 are equidistant in the sense that their distances $d_0$ are identical everywhere as well as their width $d_5$ and thus the width $d_7$ of the webs 7 remaining between the indentations 5. The distances $d_0$ define the grating period, as is readily evident based on the side view, with the duty cycle of the grating defined as the ratio of the elevation width $d_7$ to the grating period $d_0$.

The depth $d_T$ of the indentations is conventionally also identical everywhere. The material of the surface 3 and of the body 1, the grating period $d_0$, the duty cycle of the grating and the grating depth $d_T$ are therein adapted to the desired light wavelength $\lambda$.

The line grating, depicted in FIG. 1 and known per se can optionally also be arcuate, as shown in dot-dash lines. It defines a direction of progression $LG_1$. If this direction in the original surface plane E not provided with the indentations 7, is defined as y, and the direction transversely to it, as shown, as x, the following is evident: as shown schematically with light beam 9, the components $E_x$ and $E_y$ of a vectorial parameter E of the light, such as in particular its polarization, are affected differently by the line grating, i.e. the effect of the line grating with respect to such vectorial parameters of the light depends on the vector direction $\alpha$. For example, the effect of the line grating is not independent of the direction of polarization of the light in the light beam 9.

As was already explained in the introduction, it is prior known to treat light of two and more wavelengths $\lambda$ with line gratings of the type shown in FIG. 1. For this purpose, on the line grating the grating period $d_o$, in addition to optionally further parameters, is modulated in the direction of progression $LG_1$, i.e. it is locally varied. The light coupling element according to the invention to be described in the following is, however, in any event optimized for a single light wavelength $\lambda$, and thus locally modulated grating periods or line gratings with different periods in a considered region are not provided.

Figure 2:
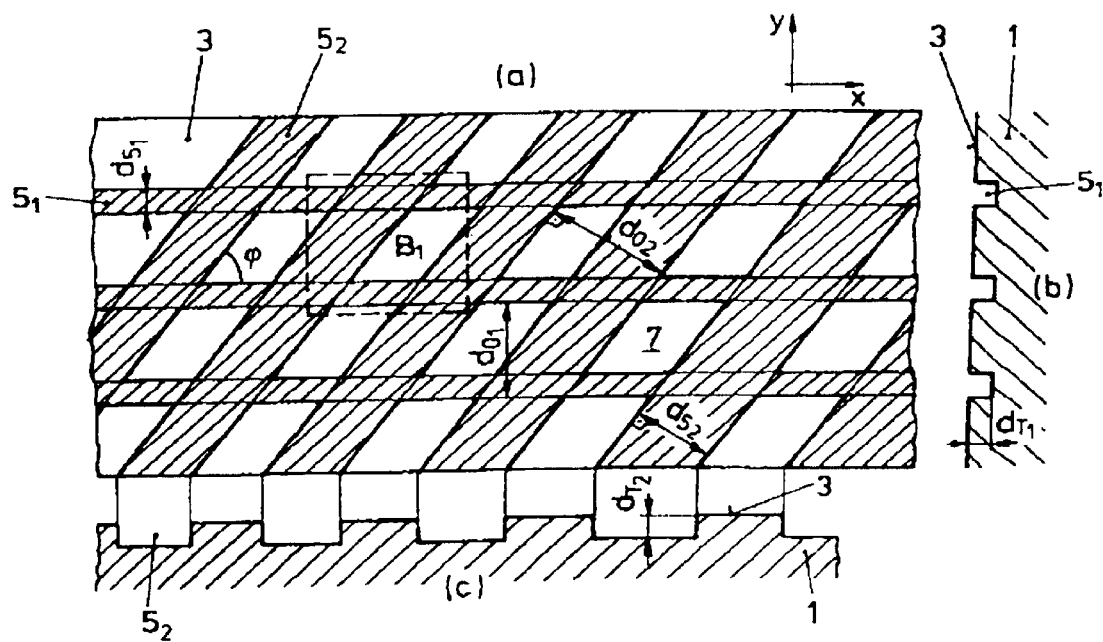

In FIG. 2 a first fundamental embodiment variant of a light coupling element according to the invention is depicted. FIG. 2(a) represents the top view, FIG. 2(b) a cross sectional representation in one direction and FIG. 2(c) a cross sectional representation in a direction perpendicular thereto. Into the surface 3 of the body 1 are worked equidistantly parallel line-form first indentations $5_1$ as well as second equidistantly parallel line-form indentations $5_2$ intersecting these at angle $\phi$. The line-form indentations $5_1$ and $5_2$ form an indentation grating, continuous in the region under consideration, in two dimensions x and y.

The first line-form indentations $5_1$ have a width $d_{51}$, the second indentations $5_2$ a width $d_{52}$.

The distances of successive first line-form indentations $5_1$ are $d_{01}$, those of successive line-form second indentations $5_2$ are $d_{02}$. These distances define the corresponding first, $d_{01}$, and second, $d_{02}$, grating periods.

Through the line-form indentations $5_1$ and $5_2$ elevation islands 7 are defined.

The first duty cycle is defined by the ratio $(d_{01}-d_{51})/d_{01}$. Analogously, the second duty cycle is defined as $(d_{02}-d_{52})/d_{02}$.

Depending on the selection of the angle $\phi$ as well as the dimensioning of the particular widths $d_{5x}$ of the line-form indentations and their distances $D_{ox}$ in the top view according to the representation of FIG. 2(a), for the remaining "islands" of elevations 7 rhomboid-form, rhombus-form, rectangular or square forms result.

If in connection with FIG. 2 the light beam 9 shown schematically in FIG. 1 of given wavelength $\lambda$ is considered, it is evident that with the light coupling element according to the invention, according to FIG. 2, both vector components $E_x$ and $E_y$ of the vectorial light parameter E, such as in particular their polarization, are specifically influenced. In the case of obliquity of angle, $\phi \neq 90°$, the position of the intersecting line-form indentations $5_1$ and $5_2$, by selecting the ratio of the grating periods $d_{01}$ and $d_{02}$ and for example the particular widths of the indentations $d_{51}$ and $d_{52}$, the effect of the light vector components corresponding to $E_x$ and $E_y$ can also be specifically influenced through the light coupling element. Thus even with $\phi \neq 90°$ with the corresponding reconciliation of said parameters $d_{01}$, $d_{02}$, $d_{51}$, $d_{52}$ the direction-independent effect of the light coupling element according to the invention on vectorial light parameters E can be attained.

It is further readily evident that the above described specific surface, for example considered on a region $B_1$ of surface 3, in the light coupling element according to the invention is substantially greater than in a light coupling element of known type, whose line grating is shown by example in FIG. 1.

Before further discussion of these effects in conjunction with FIGS. 4(a) and 4(b), in conjunction with FIG. 3 a representation analogous to FIG. 2(a), a further embodiment of a light coupling element according to the invention, will be described. In this embodiment in the surface 3 of body 1 equidistantly parallel first line-form elevations $7_1$ are present which are intersected at an angle $\phi$ by equidistantly parallel second elevations $7_2$. The resulting two-dimensional elevation grating sets boundaries to or defines the interspaced indentation "islands" 5.

Through the elevations $7_1$ or $7_2$ elevation widths $d_{71}$ and $d_{72}$ are determined as well as corresponding grating periods $d_{01}$ and $d_{02}$, for example corresponding to the distances of adjacent parallel line-form elevations $7_1$ or $7_2$. Here the duty cycles are defined by the ratio $d_{71}/d_{01}$ or $d_{72}/d_{02}$.

Figure 3:
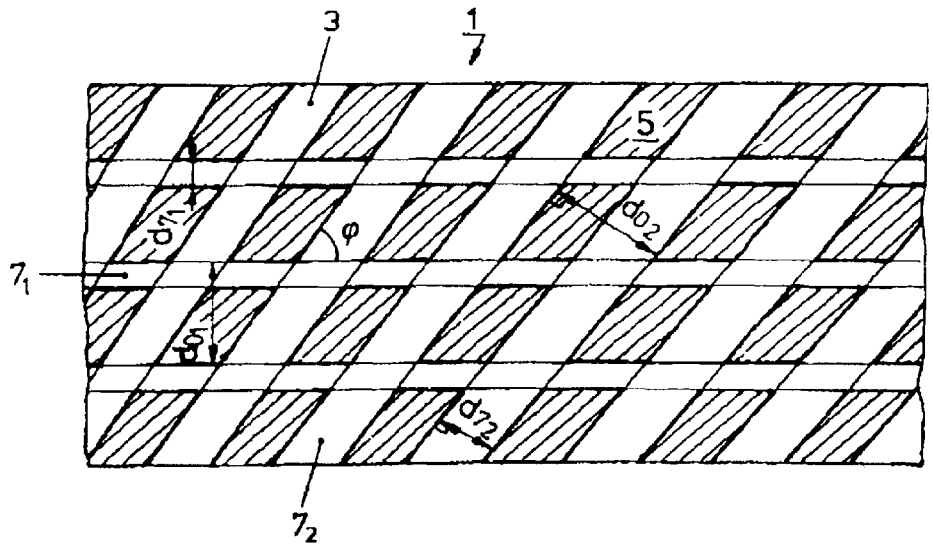

With respect to the effect of the light coupling element according to the invention depicted in FIG. 3 onto vectorial light parameters, the explanations made in connection with FIG. 2 apply as well as the explanations concerning the increase of the specific surface generated with the light coupling element according to the invention.

Figure 4:
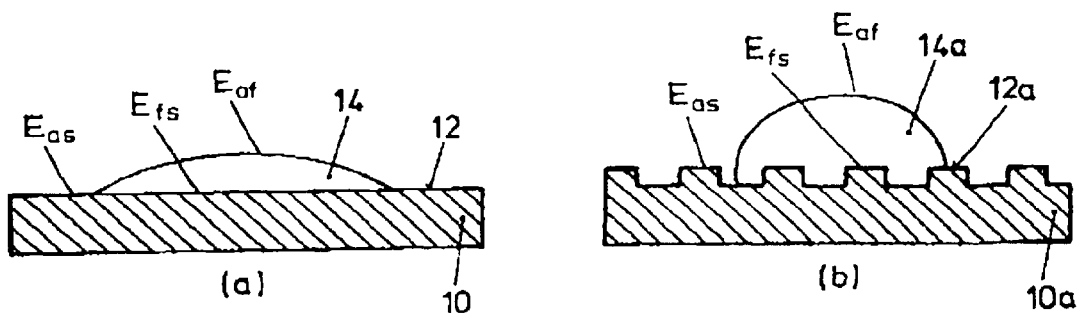

The effects of an increased specific surface onto the drop formation are shown schematically in FIG. 4. In FIG. 4(a) a body 10 with planar surface 12 is shown schematically. On the surface is disposed a liquid drop 14. In FIG. 4(b) a body 10a is depicted with a specific surface $12_a$ increased by structuring. Further, in both representations $E_{as}$ denotes the surface energy between ambient atmosphere and the surface of body 10 or 10a, $E_{fs}$ denotes the surface energies at the interfaces between the liquid of the drops 14 or 14a and the bodies 10 or 10a, and lastly $E_{fa}$ denotes the surface energy at the interfaces between the liquid of drops 14 or 14a and ambient atmosphere. In principle, a drop of liquid expands until the sum of these surface energies becomes a minimum. Since, due to the larger specific surface 12a, the surface energy $E_{fs}$ at the structured face 12a is greater than in the case of the planar surface 12, the drop 14a contracts laterally more to attain said energy minimum than in the case of planar surface 12 depicted to the left.

This effect is also attained in the transition of a prior known line grating or light coupling element according to FIG. 1 to one according to the invention according to FIG. 2 or FIG. 3: on the surfaces structured according to FIG. 2 or FIG. 3, an applied liquid drop contracts more such that, in particular for optical analyses of liquid samples, it becomes possible to apply on the surface structured according to FIG. 2 or FIG. 3 sample drops which, due to the explained effect, become "encapsulated" against adjacent ones, which also makes possible the application of a substantially increased number of discrete drops on a given extent of the surface structured according to the invention than on one structured, for example, according to FIG. 1, which is of high significance, for example, for automated fast optical analysis of a large number of samples. The danger that discrete sample drops merge with one another is significantly reduced in spite of their close application on the surface structured according to FIG. 2 or FIG. 3 distributed in two dimensions.

In a first preferred embodiment of the light coupling element according to the invention after FIG. 2 the depth $d_{T1}$ of indentations $5_1$ is equal to the depth $d_{T2}$ of indentations $5_2$.

With respect to a production method for a surface structure as shown in FIG. 2, reference is made to the full extent for example to WO 01/55760. This structure can be produced through lithography and etching techniques which are known as follows:

Onto the surface 3 of the unstructured body 1 a photoresistant laquer layer is applied, such as for example approximately 120 nm of the resist AZ1815 by Clariant. The first indentation structure 5, is exposed into the photoresistant resist layer by means of near-field holography (NFH), by means of two-beam holography or by means of mask exposure of the conventional type. It is understood that the suitable exposure technique is selected according to the size of the grating periods $d_{01}$. For very short grating periods $d_{01}$ of, for example, 360 nm, preferably holographic exposure methods are applied, in particular near-field holography (NFH), such as is described for example in WO 01/55760.

After the exposure the body surface 3 is rotated with respect to the illumination source about the angle $\phi$ (see FIG. 2), and the exposure according to the structure of the second indentations $5_2$ takes place.

After this second exposure the photoresistant resist is developed, and through a subsequent etching process the surface parts exposed after the exposure process according to $5_1$, $5_2$ are simultaneously etched away. Subsequently, the remaining photoresistant resist is removed, for example by means of an oxygen plasma. The structure with $d_{T1}=d_{T2}$ depicted in FIG. 2 thus results through the simultaneous etching of both indentation structures $5_1$, $5_2$.

Figure 5:
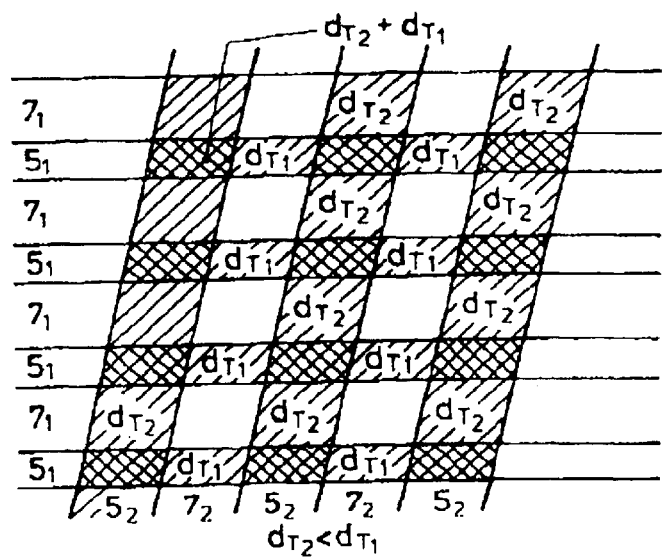

In conjunction with FIG. 5 a further preferred light coupling element according to the invention of the type depicted in FIG. 2 will be explained. Therein a structure with three depth levels of the indentation regions $5_1$, $5_2$ results. To this end, the following steps are carried out: after applying resist and after exposure of the first indentation structure $5_1$, the photoresistant resist is developed and the first line grating with depth $d_{T1}$ is etched. Thereupon the body 1 is rotated by the angle $\phi$, onto the surface resist is again applied, exposed, developed and the second indentation structure $5_2$ with depth $d_{T2}$ is etched. Based on the fact that in this procedure the two indentation structures $5_1$ and $5_2$ are etched separately, the feasibility results of selecting the etched depths $d_{T1}$ and $d_{T2}$ to be different. In FIG. 5 in top view the resulting light coupling element structure is depicted, first for the general case that the two etching depths or the depths of the indentations $d_{T1}$ and $d_{T2}$ are not equal. Therein the nonhatched fields denote structure elements at the original level of the nonstructured surface, thus elevation islands 7 according to FIG. 2. The singly hatched structure regions have the particular recorded depths, thus either $d_{T2}$ or $d_{T1}$. In the double-hatched structure regions the depths $d_{T1}$ and $d_{T2}$ are added. Thus a surface structure with three structure depth levels results $d_{T1}$, $d_{T2}$, $d_{T1}+d_{T2}$. If, therein through the corresponding dimensioning the etching times are selected, for example, as $d_{T1}=d_{T2}$, the number of levels is reduced from 3 to 2, namely to the depths $d_{T1}=d_{T2}$ and $2d_{T1}=2d_{T2}$.

It is readily evident that the light coupling element in the variants according to FIG. 5 has a further highly significantly increased specific surface, wherewith the above explained effect with respect to drop localization is utilized to an increased degree.

If the light coupling element according to the invention depicted in conjunction with FIG. 3 is considered, it is evident that here the indentation islands 5 with a corresponding photoresistant resist and etching technique can be virtually etched as pocket holes and that also optionally indentations 5 can be realized at different levels of their depth.

Furthermore, with the embodiment according to FIG. 3 it is entirely possible to realize also the line-form elevations $7_1$ or $7_2$ with depth steps, should that be desired.

While in the embodiment according to FIG. 2 the remaining elevation islands 7 can preferably be and, in particular, due to fabrication, in top view rhomboid-form, rhombus-form, rectangular or square; based on the different fabrication techniques the indentation islands 5 can, in the embodiment according to FIG. 3, be basically any shape in top view, in addition to the forms listed in connection with FIG. 2, thus in particular also circular or elliptic.

In conjunction with FIGS. 2 to 5 a light coupling element according to the invention is represented, in which only the surface of a body 1 is structured. The body defining the surface 3 can therein preferably be a layer applied onto a support, such as in particular a waveguiding layer, for example comprising $Ta_2O_5$. It must be emphasized again that even with different grating periods $d_{01}$, $d_{02}$ and/or duty cycles, this difference is not provided for the consideration of two light wavelengths, but rather, as had been explained in conjunction with FIGS. 1 and 2, in order to, even in the case of angular obliquity, $\phi \neq 90°$, of the structures provided according to the invention to act specifically onto the components of light vector parameters, such as in particular onto the polarization.

Based on the above it is evident that in a highly preferred embodiment the following is selected:

$\phi=90°$ and simultaneously $d_{01}=d_{02}$, $d_{51}=d_{52}$ or $d_{71}=d_{72}$.

Thereby the fabrication method, in particular for the form according to FIG. 2, is also decisively simplified.

In particular in view of a light coupling element, also for microtiter plates, reference is made in this regard to WO 01/55760, but in particular for the utilization of evanescent electromagnetic fields for detecting substances labeled by means of fluorescence markers, the body 1 explained so far is realized by a layer of high-refractive material transparent to laser light of the given wavelength, for example of a metal oxide, such as $Ta_2O_5$, $TiO_2$, $Nb_2O_5$, $ZrO_2$, $ZnO_2$, $HfO_2$, therein preferably with a thickness of 150 nm. The layer is therein deposited on a support, for example. of Schott Desag AF45 glass, with a layer thickness d of, for example, 0.7 mm.

Figure 6:
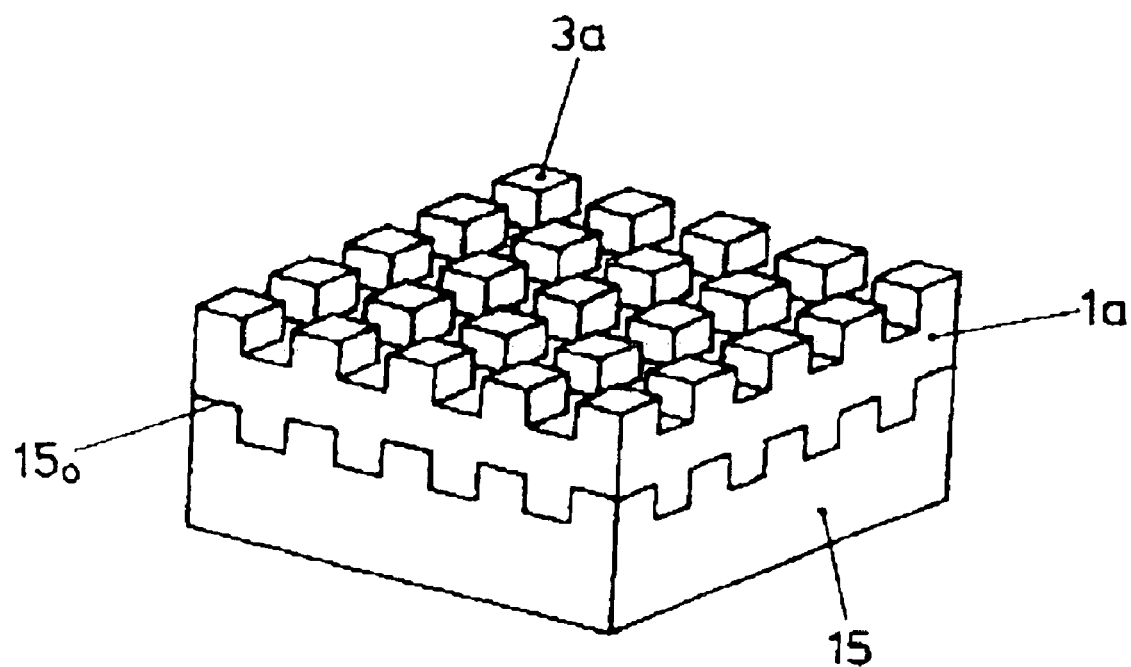

The above described structuring methods are not carried out on the surface of layer 1, but rather the structures depicted in conjunction with FIGS. 2 to 5 on the surface of the support are worked in. The surface of the support is subsequently coated with layer 1, and the structure according to the invention, applied on the surface of the support, is imaged on the surface 3 of the deposited layer 1. With a structure according to FIG. 2, with $\phi=90°$, $d_{T1}=d_{T2}$ and simultaneous etching of the indentations, the light coupling element results depicted in conjunction with FIG. 6 with support 15 according to the embodiment of FIG. 2 of structured support surface $15_0$, of the layers $1a$ applied thereon with structured surface $3a$.

The material of layer $1a$ has therein a higher refractive index than the material of support 15, which is satisfied with glass and one of said layer materials, such as in particular $Ta_2O_5$.

Figure 7:
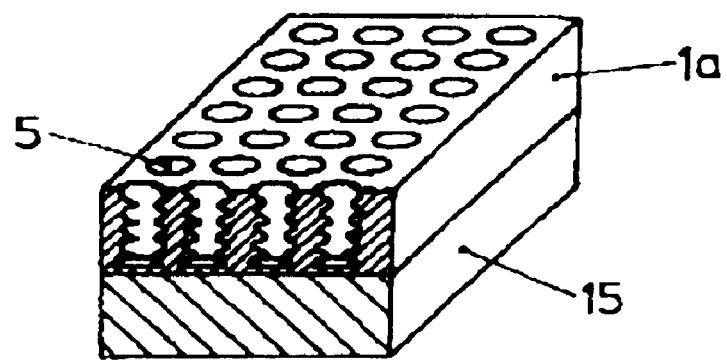

In FIG. 7 onto a support 15 is worked into the layer $1a$ a structure according to the embodiment of FIG. 3, with circular indentation islands 5.

With the light coupling element according to the invention in all of the depicted embodiments, an element is provided which acts onto vectorial light parameters, substantially independently of the vector direction. In addition, the advantage is attained that with the impingement upon the surface, structured according to the invention, by liquid drops, due to the specific surface enlargement, a concentration of the liquid drops onto clearly defined regions results, which makes possible a dense impingement upon the light coupling element with liquid samples. The light coupling element according to the invention can be utilized for all known optical analytical methods, in particular also with the utilization of the evanescent field, for the analysis of fluorescence-marked substances, but also for coupling light, in particular laser light, into or out of waveguiding layers, be this again under the aspect of optical analytical technique or within the framework of telecommunication.

What is claimed is:

1. A light coupling element having a surface (3) of a material which is transparent to light of a selected wavelength λ, for producing an evanescent electromagnetic field at the surface (3), the element comprising: a first set of equidistantly parallel indentations ($5_1$) on at least one region of the surface (3); and a further set of equidistantly parallel indentations ($5_2$) on the surface (3) which intersect ($\phi$) the first set of indentations ($5_1$), wherein all said indentations ($5_1$, $5_2$) are linear and wherein the distances ($d_0$) of successive equidistantly parallel indentations ($5_1$, $5_2$) are equal and relative to the selected wavelength λ in air are selected as follows:

$$0.1\lambda \leq d_0 \leq 10\lambda$$

and wherein the surface (3) is the surface of a layer system ($1a$) with at least one layer which is applied onto a support (15), wherein the material of the support (15) has a refractive index for the light of the selected wavelength λ which is lower than the refractive index of a layer material of the layer system.

2. A light coupling element as claimed in claim 1 further including a first set of equidistantly parallel elevations ($7_1$) on at least one region of the surface (3); and a further set of equidistantly parallel elevations ($7_2$) on the surface (3) which intersect ($\phi$) the first set of elevations ($7_1$).

3. A light coupling element as claimed in claim 2, including the first set of equidistantly parallel indentations ($5_1$) on the at least one region of the surface (3) and the further set of equidistantly parallel indentations ($5_2$) on the surface (3) which intersect ($\phi$) the first set of indentations ($5_1$), the indentations being between the elevations on the surface and having three depth levels ($d_{T1}$, $d_{T2}$, $d_{T1}+d_{T2}$).

4. A light coupling element as claimed in claim 2, including the indentations (5, $5_1$, $5_2$) disposed between the elevations (7, $7_1$, $7_2$) and being substantially of equal depth.

5. A light coupling element as claimed in claim 2, wherein the elevations ($7_1$, $7_2$) are linear.

6. A light coupling element as claimed in claim 2, wherein the first and further sets of elevations ($7_1$, $7_2$) are linear and intersect at right angles and the distances ($d_0$) of successive equidistantly parallel elevations ($7_1$, $7_2$) are equal.

7. A light coupling element as claimed in claim 2, wherein distances ($d_0$) of successive equidistantly parrallel elevations ($7_1$, $7_2$) are selected as follows:

$$200 \text{ nm} \leq d_0 \leq 20000 \text{ nm}.$$

8. A light coupling element as claimed in claim 2, wherein distances ($d_0$) of successive equidistantly parallel elevations ($7_1$, $7_2$) are selected as follows:

$$40 \text{ nm} \leq d_0 \leq 4000 \text{ nm}.$$

9. A light coupling element as claimed in claim 2, wherein distances ($d_0$) of successive equidistantly parallel elevations ($7_1$, $7_2$) are selected as follows:

$$100 \text{ nm} \leq d_0 \leq 1200 \text{ nm}.$$

10. A light coupling element as claimed in claim 2, wherein the distances ($d_0$) of successive equidistantly parallel ($7_1$, $7_2$) relative to the selected wavelength $\lambda$ in air are selected as follows:

$$0.1\lambda \leq d_0 \leq 10\lambda.$$

11. A light coupling element as claimed in claim 2, wherein the distances ($d_0$) of successive equidistantly parallel ($7_1$, $7_2$) relative to the selected wavelength $\lambda$ in air are selected as follows:

$$0.2\lambda \leq d_0 \leq 2\lambda.$$

12. A light coupling element as claimed in claim 2, wherein the distances ($d_0$) of successive equidistantly parallel ($7_1$, $7_2$) relative to the selected wavelength $\lambda$ in air are selected as follows:

$$0.5\lambda \leq d_0 \leq 0.6\lambda.$$

13. A light coupling element as claimed in claim 2, wherein a duty cycle, defined as the ratio of elevation width to the distance of successive elevations, is selected to be 0.2 to 0.8.

14. A light coupling element as claimed in claim 13, wherein the surface of the support (15) in the region has the same indention structure as the surface of the layer system (1a) and that, in the top view, the structures are aligned one on another.

15. A light coupling element as claimed in claim 14, wherein the high-refractive material is at least one of the following materials: $Ta_2O_5$, $TaO_2$, $NbO_5$, $ZrO_2$, $ZnO$, $HfO_2$.

16. A light coupling element as claimed in claim 13, wherein the layer system has at least one layer of a high-refractive material.

17. A light coupling element as claimed in claim 13, wherein the layer system has a thickness $d_S$ of 2 nm to 20000 nm.

18. A light coupling element as claimed in claim 13, wherein the layer system has a thickness $d_S$ of 20 nm to 4000 nm.

19. A light coupling element as claimed in claim 13, wherein the layer system has a thickness $d_S$ to 40 nm to 600 nm.

20. A light coupling element as claimed in claim 13, wherein the layer system has a thickness $d_S$ of 150 nm.

21. A light coupling element as claimed in claim 13, wherein the layer system, relative to the selected wavelength $\lambda$ in air, has a thickness $d_S$ for which, relative to the selected wavelength $\lambda$, in air applies:

$$0.01\lambda \leq d_S \leq 10\lambda.$$

22. A light coupling element as claimed in claim 13, wherein the layer system, relative to the selected wavelength $\lambda$ in air, has a thickness $d_S$ for which, relative to the selected wavelength $\lambda$, in air applies:

$$0.01\lambda \leq d_S \leq 2\lambda.$$

23. A light coupling element as claimed in claim 22, wherein the surface of the support (15) in the region has the same elevation structure as the surface of the layer system (1a) and that, in top view, the structures are aligned one on another.

24. A light coupling element as claimed in claim 22, wherein the layer system has at least one layer of a high-refractive material, preferably of at laest one of the following materials: $Ta_2O_5$, $TaO_2$, $NbO_5$, $ZrO_2$, $ZnO$, $HfO_2$.

25. A light coupling element as claimed in claim 22, wherein the layer system has a thickness $d_S$ of 2 nm to 20000 nm.

26. A light coupling element as claimed in claim 22, wherein the layer system has a thickness $d_S$ of 20 nm to 4000 nm.

27. A light coupling element as claimed in claim 22, wherein the layer system has a thickness $d_S$ of 40 nm to 600 nm.

28. A light coupling element as claimed in claim 22, wherein the layer system has a thickness $d_S$ of 150 nm.

29. A light coupling element as claimed in claim 22, wherein the layer system, relative to the selected wavelength $\lambda$ in air, has a thickness $d_S$ for which, relative to the selected wavelength $\lambda$, in air applies:

$$0.01\lambda \leq d_S \leq 10\lambda.$$

30. A light coupling element as claimed in claim 22, wherein the layer system, relative to the selected wavelength $\lambda$ in air, has a thickness $d_S$ for which, relative to the selected wavelength $\lambda$, in air applies:

$$0.01\lambda \leq d_S \leq 2\lambda.$$

31. A light coupling element as claimed in claim 22, wherein the layer system, relative to the selected wavelength $\lambda$ in air, has a thickness $d_S$ for which, relative to the selected wavelength $\lambda$, in air applies:

$$0.2\lambda \leq d_S \leq 0.3\lambda.$$

32. A light coupling element as claimed in claim 13, wherein the layer system, realtive to the selected wavelength $\lambda$ in air, has a thickness $d_S$ for which, relative to the selected wavelength $\lambda$, in air applies:

$$0.2\lambda \leq d_S \leq 0.3\lambda.$$

33. A light coupling element as claimed in claim 2, wherein a duty cycle, defined as the ratio of elevation width to the distance of successive elevations, is selected to be 0.4 to 0.6.

34. A light coupling element as claimed in claim 2, on an optical analysis paltform for substance analysis.

35. A light coupling element as claimed in claim 2 in combination with a telecommunication data transmission apparatus.

36. A light coupling element as claimed in claim 1, wherein the first and further sets of indentions ($5_1$, $5_2$) intersect at right angles.

37. A light coupling element as claimed in claim 1, wherein distances ($d_0$) of successive equidistantly parallel indentions ($5_1$, $5_2$) are selected as follows:

$$200\ nm \leq d_0 \leq 20000\ nm.$$

38. A light coupling element as claimed in claim 1, wherein distances ($d_0$) of successive equidistantly parallel indentions ($5_1$, $5_2$) are selected as follows:

$$40\ nm \leq d_0 4000\ nm.$$

39. A light coupling element as claimed in claim 1, wherein distances ($d_0$) of successive equidistantly parallel indentations ($5_1$, $5_2$) are selected as follows:

$$100\ nm \leq d_0 \leq 1200\ nm.$$

40. A light coupling element as claimed in claim 1, wherein the distances ($d_0$) of successive equidistantly parallel indentations ($5_1$, $5_2$) relative to the selected wavelength $\lambda$ in air are selected as follows:

$$0.2\lambda \leq d_0 \leq 2\lambda.$$

41. A light coupling element as claimed in claim 1, wherein the distances ($d_0$) of successive equidistantly parallel indentations ($5_1$, $5_2$) relative to the selected wavelength $\lambda$ in air are selected as follows:

$$0.5\lambda \leq d_0 \leq 0.6\lambda.$$

42. A light coupling element as claimed in claim 1, wherein the depth $d_T$ of the indentions is 0.2 nm to 20000 nm.

43. A light coupling element as claimed in claim 1, wherein the depth $d_T$ of the indentations is 10 nm to 400 nm.

44. A light coupling element as claimed in claim 1, wherein the depth $d_T$ of the indentations relative to the selected wavelength $\lambda$ in air is selected as follows:

$$0.001\lambda \leq d_T \leq 10\lambda.$$

45. A light coupling element as claimed in claim 1, wherein the depth $d_T$ of the indentations relative to the selected wavelength $\lambda$ in air is selected as follows:

$$0.01\lambda \leq d_T \leq \lambda.$$

46. A light coupling element as claimed in claim 1, wherein the depth $d_T$ of the indentations relative to the selected wavelength $\lambda$ in air is selected as follows:

$$0.05\lambda \leq d_T \leq 0.2\lambda.$$

47. A light coupling element as claimed in claim 1, wherein a duty cycle, defined as the ration of elevation width to the distance of successive indentations, is selected to be 0.2 to 0.8.

48. A light coupling element as claimed in claim 1, wherein a duty cycle, defined as the ratio of elevation width to the distance of successive indentations, is selected to be 0.4 to 0.6.

49. A light coupling element as claimed in claim 1, including elevations (7) between the equidistantly parallel indentations ($5_1$, $5_2$) in top view being rhombiod, rhombus, rectangular or square.

50. A light coupling element as claimed in claim 1, on an optical analysis platform for substance analyses.

51. A light coupling element as claimed in claim 1 in combination with a telecommunication data transmission apparatus.

* * * * *